United States Patent
Morioka et al.

(10) Patent No.: US 7,527,689 B2
(45) Date of Patent: May 5, 2009

(54) CEMENT ADMIXTURE, CEMENT COMPOSITION, AND METHOD FOR SUPPRESSING CARBONATION USING THE SAME

(75) Inventors: Minoru Morioka, Niigata (JP);
Takayuki Higuchi, Niigata (JP);
Hiroyuki Ohashi, Niigata (JP);
Yasuhiro Nakashima, Niigata (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 9 days.

(21) Appl. No.: 11/923,010

(22) Filed: Oct. 24, 2007

(65) Prior Publication Data

US 2008/0282936 A1 Nov. 20, 2008

Related U.S. Application Data

(62) Division of application No. 10/486,827, filed as application No. PCT/JP02/08382 on Aug. 20, 2002, now abandoned.

(30) Foreign Application Priority Data

Aug. 21, 2001 (JP) .............................. 2001-249999
Aug. 21, 2001 (JP) .............................. 2001-250000
Dec. 5, 2001 (JP) .............................. 2001-371071

(51) Int. Cl.
*C04B 7/14* (2006.01)
*C04B 7/153* (2006.01)

(52) U.S. Cl. ...................... 106/714; 106/819; 106/602; 106/606; 106/699; 106/703; 106/815; 106/789; 106/734; 106/737

(58) Field of Classification Search ................. 106/819, 106/602, 606, 699, 703, 714, 815, 789, 734, 106/737
See application file for complete search history.

(56) References Cited

U.S. PATENT DOCUMENTS

| 4,124,404 | A | 11/1978 | Suzuki et al. | 106/765 |
|---|---|---|---|---|
| 5,478,392 | A | 12/1995 | Hooykaas | 106/789 |
| 6,334,885 | B1 | 1/2002 | Fukushima et al. | 75/746 |
| 6,491,751 | B1 | 12/2002 | Watson | 106/756 |
| 6,627,138 | B2 | 9/2003 | Stroup et al. | 264/333 |
| 6,869,473 | B2 | 3/2005 | Comrie | 106/697 |

FOREIGN PATENT DOCUMENTS

| EP | 572076 | 12/1993 |
|---|---|---|
| JP | 51-147420 | 12/1976 |
| JP | 61-21793 | 1/1986 |
| JP | 4-50154 | 2/1992 |
| JP | 6-321590 | 11/1994 |
| JP | 2001-294459 | 10/2001 |
| JP | 2002-03249 | 1/2002 |
| JP | 2002-47052 | 2/2002 |

OTHER PUBLICATIONS

"The Application of the Composite Mineralizer in the Production of Cement by Vertical Kiln" Shanxi Construction Materials, vol. 1, 1995, pp. 19-23 (with English translation).

*Primary Examiner*—Elizabeth D Wood
(74) *Attorney, Agent, or Firm*—Oblon, Spivak, McClelland, Maier & Neustadt, P.C.

(57) ABSTRACT

A cement admixture and a cement composition having a carbonation suppressing effect and a heat-of-hydration suppressing effect are provided. A cement admixture containing one or more non-hydraulic compounds selected from the group consisting of $\gamma$-$2CaO.SiO_2$, $\alpha$-$CaO.SiO_2$ and calcium magnesium silicate, a cement composition containing said admixture, and a carbonation suppressing method by use of said cement admixture or cement composition. According to the present invention, a remarkable carbonation suppressing effect can be obtained particularly when used in portland blast-furnace slag cement. This leads to an effective use of steelmaking slag and the like, and the load of clinker can be reduced, so that a cement composition of a low environmental load type can be attained. Further, this is suitable for cements in conformity with the EN standards, which are used in civil engineering and building industries.

13 Claims, No Drawings

CEMENT ADMIXTURE, CEMENT COMPOSITION, AND METHOD FOR SUPPRESSING CARBONATION USING THE SAME

TECHNICAL FIELD

The present invention relates to a cement admixture, a cement composition, and a method for suppressing carbonation using the same, which are mainly used in civil engineering and construction industries.

In the present invention, "part(s)" and "%" are indicated by mass basis, unless otherwise particularly provided. Furthermore, in the present invention, "concrete" collectively refers to cement pastes, mortars, and concretes.

BACKGROUND ART

Great attention has been paid to the effective use of various kinds of slags, which are by-products in the steel industry. In the steel industry, slags are produced as by-products, with different compositions and properties depending upon kinds of processes and facilities, and also upon kinds of steel produced by melting.

For example, blast furnace slag is produced as by-product from a blast furnace which is used in a process for producing pig iron. Furthermore, molten iron pretreatment slag, converter slag, and electric furnace slag are respectively produced as by-products from a molten pretreatment facility, a converter, and an electric furnace.

Furthermore, there are granulated slag and slowly cooled slag in the blast furnace slag, and there are desilication slag, dephosphorization slag, desulurization slag, and decarburization slag in the molten iron pretreatment slag. Even in the electric furnace slag, there are oxidizing period slag, and reducing period slag.

With respect to the kind of steel, there are plain carbon steel, super low carbon steel, special alloy steel, and stainless steel.

Of the above-mentioned slags, blast furnace granulated slag produced as by-product from the blast furnace is used as a material for use in concrete admixture, base course and others. Furthermore, it is reported that converter slag, when subjected to a treatment such as deferrization, can be used as a material for base course.

However, many of the slags other than blast furnace granulated slag have not yet found any effective application. Furthermore, with respect to a slag which has already found some applications, the situation is such that it cannot be said that presently it is sufficiently reused, because each slag has a significantly different composition and physical properties, depending upon its manufacture and its lot, and therefore it is difficult to expand the range of its reuses, and even if it can be used for base course only, the demand for it is limited.

There is no effective use for steelmaking slag produced from steelmaking process, so that presently steelmaking slag is discarded as industrial waste. The term "steelmaking slag" used in the present invention specifically means electric furnace reducing period slag, molten iron pretreatment slag, stainless slag, and converter slag, but does not include granulated blast furnace slag and slowly cooled blast furnace slag.

Some of these slags contain a $\beta$-$2CaO.SiO_2$ phase, and others contain a $\gamma$-$2CaO.SiO_2$ phase. Slags which contain the $\beta$-$2CaO.SiO_2$ phase exhibit hydraulicity, so that the use thereof as a material for a cement admixture and others is now being studied. However, slags containing the $\gamma$-$2CaO.SiO_2$ phase have not found any effective use.

This is due to a dusting phenomenon. The steelmaking slag comprises dicalcium silicate ($2CaO.SiO_2$) as a main compound, so that in the course of a cooling process for the slag, $2CaO.SiO_2$ is transformed from an $\alpha$ phase which is a high temperature phase to a $\alpha'$ phase, and then to a $\beta$ or $\gamma$ phase which is a low temperature phase. When $2CaO.SiO_2$ is transformed from the $\alpha'$ phase to the $\gamma$ phase which is a low temperature phase, it swells with a significant change in the density thereof and is pulverized. This phenomenon is called "dusting".

Due to the above-mentioned dusting phenomenon, the steelmaking slag, unlike other slags, cannot be obtained in either in a massive form or in the form of particles, and therefore cannot be used as a material either for base course or for aggregate.

Conventionally, as a method of preventing the dusting caused by $2CaO.SiO_2$, there has been proposed, for example, a method of stabilizing $2CaO.SiO_2$ in the $\beta$ phase with the addition thereto of a crystal stabilizer such as a boron compound (JP-A-62-162657). However, the boron compound itself is expensive and some improvements on the facilities and processes therefor are required, so that this method is costly.

On the other hand, there are known a special cement prepared by pulverizing an electric furnace reducing period slag without adding a crystal stabilizer thereto, and mixing the same with calcium aluminate $12CaO.7Al_2O_3$ and gypsum (JP-B-62-47827), and a special cement prepared by mixing a solid solution of calcium aluminate $12CaO.7Al_2O_3$ and $CaF_2$ with gypsum (JP-B-62-50428 and others).

This invention is made by directing attention to the fact that although the electric furnace reducing period slag comprises non-hydraulic $\gamma$-$2CaO.SiO_2$ as a main component, the slag also contains a large amount of $12CaO.7Al_2O_3$ which has high hydration activity, and attempts to obtain a hardened material with a desired strength, with the formation of ettringite by the addition of gypsum.

However, hardened materials obtained from the above-mentioned special cements have poor resistance to carbonation caused by carbon dioxide gas in the air, so that it is not expected that such hardened materials have the same durability as that of a hardened material obtained from Portland cement. Furthermore, it is difficult to secure fluidity and a usable time period unless a setting retarder is used in combination. Furthermore, in the above-mentioned invention, nothing is mentioned about the mixing of the electric furnace reducing period slag with Portland cement and with tricalcium silicate $3CaO.SiO_2$ which is a main component of Portland cement, thereby imparting a function of providing a carbonation suppressing effect and others.

The inventors of the present invention paid their attention to the above-mentioned slag comprising $\gamma$-$2CaO.SiO_2$ as a main component, and studied the application thereof to a cement admixture. Furthermore, they studied as to how to cope with new international standards based on the European Standards (EN Standards), and also studied the subjects of the control of heat of hydration and the prevention of carbonation.

At present, new international standards are under study abroad, which use the European Standards (EN Standards) as the basic idea thereof, and can select a cement material group largely classified based on the strength thereof in accordance with the desired objective.

According to the European Standards (EN Standards), compressive strength is broadly classified into a 32.5 N/mm$^2$ class, a 42.5 N/mm$^2$ class, and a 52.5 N/mm$^2$ class (Koji Goto, Shunsuke Hanehara, Internationalization of Cement Standards—Outline and Direction of European Standards—, Cement. Concrete, No. 631, pp 1 to 8, 1999).

On the other hand, in Japan, the quality of cements has been designed based on JIS. As a result, cements with good strength revelation have been evaluated as good cements under the standardized specifications.

As a result, when classified in accordance with the EN Standard, in Japan, there are only cements which correspond to either the 42.5 N/mm$^2$ class or the 52.5 N/mm$^2$ class in terms of compressive strength. Therefore, at present, even if there is carried out design of mix for a concrete not having so high a design strength, the strength tends to become excessive in many cases.

The prevention of the excessive strength is important in view of the prevention of the resulting generation of excessive heat of hydration, and also in view of the prevention of the cracking after hardening by minimizing the degree of shrinkage before and after hardening.

There can be conceived a design of mix for a concrete not having so high a design strength by use of a cement with excellent strength revelation, thereby reducing the unit cement amount. In this case, however, the unit cement amount becomes extremely small, so that a problem occurs that there is formed a concrete from which ingredients are apt to be separated, having a large breeding ratio, that is, a gradients-separated concrete.

When a concrete structure is built by use of such a concrete, there is a problem that it is difficult to built a concrete structure having durability since macroscopic defects are apt to occur.

Thus, the EN Standards are characterized in that there is provided a cement of the 32.5 N/mm$^2$ class in terms of compressive strength, which facilitates the design of mix for a concrete with not so high a design strength.

At present, a limestone-mixed cement is in a main stream of cements that are in conformity with the EN standards. The limestone-mixed cement is composed of Portland cement and a large quantity of limestone fine powder, which is capable of attaining both the prevention of excessive strength and the improvement on the resistance against the separation of ingredients of the cement.

The limestone fine powder can be regarded as an inactive powder in view of the revelation of strength, but can advantageously impart only the resistance against the separation of ingredients to the cement, thereby suppressing the revelation of excessive strength and the generation of heat of hydration. In such circumstances, studies on the limestone-mixed cement have now been actively made in Japan.

However, limestone is an important raw material in many industries. Limestone is one of precious natural resources in Japan which has scarce natural resources. If it is used only for mixing it with concrete, it will resultantly be used up, and therefore it is earnestly desired to use limestone more effectively as an industrial raw material. The limestone-mixed cement has a shortcoming that it is easily carbonated.

DISCLOSURE OF THE INVENTION

The inventor of the present invention has diligently studied to solve the above-mentioned problems of the limestone-mixed cement, and discovered that particular non-hydraulic compounds such as $\gamma$-2CaO.SiO$_2$, $\alpha$-CaO.SiO$_2$ and calcium magnesium silicate, and substances which contain such particular non-hydraulic compounds, which have not found any particular applications as materials for cement admixtures, exhibit such strength revelation and ingredient separation resistance that are equal to those of limestone fine powder, and that such particular non-hydraulic compounds have a carbonation suppressing effect that is not found in limestone fine powder.

Cement admixtures comprising these particular non-hydraulic compounds not only suppress the carbonation of Portland cement, but also have an effect of reducing the generation of heat of hydration, thereby controlling thermal shrinkage after hardening, and the formation of cracks in the hardened material.

Of the materials which constitute concrete, such as cement, fine aggregate, coarse aggregate and water, cement is a material having a largest environmental load. This is largely due to the fact that when producing cement, carbon dioxide is discharged by dicarboxylation of limestone which is a main raw material for the cement, and also due to the fact that carbon dioxide is discharged when fuel is burned. Therefore, portland blast-furnace slag cement and limestone-mixed cement, with a small mix amount of a cement clinker and mixed with a mixture material, can be said to be cements of a small environmental load.

The inventor of the present invention has paid attention to a steelmaking slag, which is an industrial by-product, and contains a particular non-hydraulic compound such as $\gamma$-2CaO.SiO$_2$, $\alpha$-CaO.SiO$_2$ and calcium magnesium silicate, and studied the application thereof to be used as a cement admixture.

It has been discovered that when a hardened material prepared by use of a cement admixture of the present invention and a hardened material prepared by use of limestone fine powder admixture are compared, as long as the amount of each cement admixture is the same, the compressive strength of the hardened material by use of the present invention is almost equal to that of the hardened material by use of limestone fine powder, but the former generates less heat of hydration than the latter, and the former exhibits a better carbonation suppressing effect than the latter in which limestone powder admixture is used.

This discovery will lead to the effective use of the steelmaking slag, such as electric furnace reducing period slag, stainless slag, molten iron pretreatment slag, and converter slag, which have not found any effective use. Furthermore, it has been discovered that by making effective use of these slags, these could be made cement compositions of a low environmental load type, since the loading of a cement clinker can be reduced. The present invention has been made based on these discoveries.

The present invention is essentially directed to the following structures:

(1) A cement admixture characterized by comprising at least one or more non-hydraulic compounds selected from the group consisting of $\gamma$-2CaO.SiO$_2$, $\alpha$-CaO.SiO$_2$ and calcium magnesium silicate.

(2) The cement admixture according to (1), wherein the content of fluorine is 2.0% or less, and the content of 12CaO.7Al$_2$O$_3$ and/or 11CaO.CaF$_{20}$ is 25% or less.

(3) The cement admixture according to (1) or (2), wherein a material comprising the non-hydraulic compound is a steel-making slag.

(4) The cement admixture according to any one of (1) to (3), wherein the total content of $\gamma$-2CaO.SiO$_2$, $\alpha$-CaO.SiO$_2$ and calcium magnesium silicate is 65% or more.

(5) The cement admixture according to any one of (1) to (4), wherein the content of $\gamma$-2CaO.SiO$_2$ is 35% or more.

(6) The cement admixture according to any one of (1) to (5), with a Blaine specific surface area of 2,000 cm$^2$/g or more.

(7) The cement admixture according to any one of (1) to (6), wherein the calcium magnesium silicate is $3CaO.MgO.2SiO_2$, $2CaO.MgO.2SiO_2$, or $CaO.MgO.SiO_2$.

(8) A cement composition comprising a cement and the cement admixture as defined in any one of (1) to (7).

(9) The cement composition according to (8), wherein the content of the cement admixture is from 5 to 50 parts in 100 parts of the total of the cement and the cement admixture.

(10) The cement composition according to (8) or (9), wherein the cement is Portland cement.

(11) The cement composition according to (8) or (9), wherein the cement is a portland blast-furnace slag cement.

(12) A method of suppressing carbonation of a cement hardened material prepared by use of the cement admixture or the cement composition as defined in (1) to (11).

BEST MODE FOR CARRYING OUT THE INVENTION

The present invention will now be explained in detail.

$\gamma$-$2CaO.SiO_2$ in the present invention is known as a low temperature phase out of the compounds represented by $2CaO.SiO_2$ and is entirely different from $\alpha$-$2CaO.SiO_2$ or $\alpha'$-$2CaO.SiO_2$, which is a high temperature phase, and $\beta$-$2CaO.SiO_2$. All of these can be represented by $2CaO.SiO_2$, but each of them has a different crystalline structure and a different density.

$2CaO.SiO_2$ which is usually present in Portland cement is $\beta$-$2CaO.SiO_2$. $\beta$-$2CaO.SiO_2$ exhibits hydraulicity, but does not have a carbonation suppressing effect as $\gamma$-$2CaO.SiO_2$ of the present invention does have.

$\alpha$-$CaO.SiO_2$ ($\alpha$-type wollastonite) in the present invention is known as a high temperature phase in the compounds represented by $CaO.SiO_2$ and is entirely different from $\beta$-$CaO.SiO_2$ which is a low temperature phase. All of these are presented by $CaO.SiO_2$, but each of them has a different crystalline structure and a different density.

A naturally occurring wollastonite is a low-temperature phase $\beta$-$CaO.SiO_2$. $\beta$-$CaO.SiO_2$ has a needle-like crystalline form and is used as inorganic fiber material, for instance, as wollastonite fiber, but does not have such a carbonation suppressing effect as that of $\alpha$-$CaO.SiO_2$ of the present invention.

"Calcium magnesium silicate" in the present invention collectively refers to $CaO.MgO.SiO_2$ type compounds, and there is no particular limitation thereon. Specific preferable examples include Merwinite represented by $3CaO.MgO.2SiO_2$ ($C_3MS_2$), Akermanite represented by $2CaO.MgO.2SiO_2$ ($C_2MS_2$), and Monticellite represented by $CaO.MgO$—$SiO_2$ (CMS). Of these, Merwinite is particularly preferable because of its large carbonation suppressing effect.

Melilite, which is a mixed crystal of Akermanite and Gehlenite, can be used. However, when Melilite is used, it is preferable that the content of Gehlenite be 30% or less, more preferably 20% or less.

In the present invention, there can be used one or two or more non-hydraulic compounds selected from the group consisting of $\gamma$-$2CaO.SiO_2$, $\alpha$-$CaO.SiO_2$ and calcium magnesium silicate. As the non-hydraulic compounds for use in the present invention, there can be given rankinite and anorthite out of the above-mentioned compounds, in addition to $\gamma$-$2CaO.SiO_2$, wollastonite $CaO.SiO_2$, and calcium magnesium silicate.

Of these non-hydraulic compounds, $\gamma$-$2CaO.SiO_2$ is particularly preferable because its carbonation suppressing effect is great and lasts for an extended period of time, and also because its carbonation suppressing effect is significantly great when used in combination with portland blast-furnace slag cement.

$\gamma$-$2CaO.SiO_2$, $\alpha$-$CaO.SiO_2$, or calcium magnesium silicate of the present invention can be synthesized by mixing a CaO raw material, a $SiO_2$ raw material, and a MgO raw material in predetermined molar ratios, and subjecting the mixture to heat treatment. As the CaO raw material, there can be given, for example, calcium carbonate such as limestone, and calcium hydroxide such as slaked lime. As the $SiO_2$ raw material, there can be given, for example, silica stone, clay, and various silica dust, produced as industrial by-products, representative examples of which are silica fume and fly ash. As the MgO raw material, there can be given, for example, magnesium hydroxide, basic calcium carbonate, and dolomite.

There is no particular limitation on the method of the heat treatment. For example, the heat treatment can be carried out in a rotary kiln or in an electric furnace. The heat treatment, although its temperature cannot be uniformly set, is usually carried out at temperatures in the range of from about 1,000 to 1,800° C., and in many cases at temperatures in the range of from about 1,200 to 1,600° C.

In the present invention, there can be employed an industrial by-product which comprises one or more non-hydraulic compounds selected from the group consisting of $\gamma$-$2CaO.SiO_2$, $\alpha$-$CaO.SiO_2$, and calcium magnesium silicate. In this case, impurities coexist. As such an industrial by-product, there can be given, for example, a steelmaking slag.

Specific examples of the impurities are $Al_2O_3$, $Fe_2O_3$, $TiO_2$, MnO, $Na_2O$, $K_2O$, S, $P_2O_5$, F, and $B_2O_3$. Examples of coexisting compounds are calcium aluminate, calcium aluminosilicate, calcium ferrite, calcium aluminoferrite, calcium phosphate, calcium borate, magnesium silicate, leucite ($K_2O$, $Na_2O$).$Al_2O_3.SiO_2$, spinel $MgO.Al_2O_3$, and magnetite $Fe_3O_4$. There is no particular limitation on the presence of the coexisting compounds due to the presence of these impurities and there are no particular problems so long as the presence thereof does not hinder the objects of the present invention. However, care must be taken as to the content of fluorine and that of calcium aluminate.

The steelmaking slag that can be used in the present invention comprises one or two or more compounds selected from the group consisting of $\gamma$-$2CaO.SiO_2$, $\alpha$-$CaO.SiO_2$ and calcium magnesium silicate.

Some steelmaking slag, however, contains a large quantity of $12CaO.7Al_2O_3$ or $11CaO.7Al_2O_3.CaF_2$ with fluorine being present in the form of a solid solution, each of which exhibits quick setting or rapid hardening properties. When the contents of these compounds are high, it is not preferable not to use a setting retarder from the viewpoint of securing the fluidity and the usable time period.

To be more specific, a steelmaking slag with the total amount of $12CaO.7Al_2O_3$ and/or $11CaO.7Al_2O_3.CaF_2$ (hereinafter this may be referred to as $12CaO.7Al_2O_3$ solid solution as well) being 25% or less is preferable, and 15% or less is particularly more preferable. When the total amount of $12CaO.7Al_2O_3$ and/or $11CaO.7Al_2O_3.CaF_2$ in the cement admixture of the present invention (hereinafter, this may be referred to as the present admixture as well) exceeds 25%, there may be a case where the carbonation suppressing effect is reduced, the fluidity becomes improper, or the usable time period cannot be secured.

Furthermore, some steelmaking slag contains a large quantity of fluorine. In such a fluorine-containing steelmaking slag, $12CaO.7Al_2O_3$ exists in the form of $11CaO.7Al_2O_3.CaF_2$ with fluorine in a solid solution. Part of $\gamma$-$2CaO.SiO_2$ changes to Cuspidine ($3CaO.2SiO_2.CaF_2$). In some steelmaking slag, $CaF_2$ coexists. $\gamma\text{-}2CaO.SiO_2$ has a conspicuous carbonation suppressing effect. In contrast to this, $11CaO.7Al_2O_3.CaF_2$ and a fluorine-containing compound such as Cuspidine have no carbonation suppressing effect, so that there may be a case where a steelmaking slag with a large content of fluorine does not exhibit a conspicuous carbonation suppressing effect.

Furthermore, fluorine hinders the setting and hardening of Portland cement, so that there may be a case where fluorine retards setting or causes improper hardening. Furthermore, fluorine is a substance to which a law (PRTR law) applies, which concerns the promotion of the improvement on the seizure and control of the amount of the release of particular chemical materials to the environment. Materials containing a large amount of fluorine are unacceptable from the viewpoint of preservation of the environment.

It is preferable that the total content of fluorine in the present admixture be 2.0% or less, regardless of its form of presence, more preferably 1.5% or less. When the total content of fluorine exceeds 2.0%, there may be a case where a sufficient carbonation suppressing effect cannot be obtained, or setting and hardening states become improper. Furthermore, as mentioned above, there is a risk that fluorine bleeds from a hardened material made by Portland cement using this admixture, which is not acceptable from the viewpoint of an environmental problem.

It is preferable that the content of $\gamma\text{-}2CaO.SiO_2$ in the present admixture be 35% or more, more preferably 45% or more. There is no particular limit on the upper limit of the content of $\gamma\text{-}2CaO.SiO_2$. In the steelmaking slag, an electric furnace reducing period slag or a stainless slag, with a large content of $\gamma\text{-}2CaO.SiO_2$, is preferable.

In the present admixture, it is preferable that the total content of $\gamma\text{-}2CaO.SiO_2$, $\alpha\text{-}CaO.SiO_2$, and calcium magnesium silicate, which are non-hydraulic compounds, be 65% or more. It is more preferable that the content of the non-hydraulic compounds be 70% or more. In the present invention, hydraulic $2CaO.SiO_2$ other than $\gamma\text{-}2CaO.SiO_2$ may be mixed, with a maximum mixed amount thereof being 35%.

As a method of determining the amount of the non-hydraulic compound in the present admixture, there can be given, for example, a method of identifying crystalline phases by X-ray powder diffractometry, followed by calculation of each crystalline phase from the chemical analysis values thereof, and Rietvelt analysis using X-ray powder diffractometry.

There is no particular limit on the Blaine specific surface area of the present admixture. However, it is preferable that the Blaine specific surface area of the present admixture be 2,000 $cm^2/g$ or more. It is preferable that the upper limit thereof be 8,000 $cm^2/g$ or less. In particular, from 3,000 $cm^2/g$ to 6,000 $cm^2/g$ is more preferable, and from 4,000 $cm^2/g$ to 6,000 $cm^2/g$ is most preferable. When the Blaine specific surface area of the present admixture is less than 2,000 $cm^2/g$, there may be a case where the ingredient separation resistance cannot be obtained, or the carbonation suppression becomes insufficient. On the other hand, it is not economical to pulverize the admixture so as to have such a Blaine specific surface area that exceeds 8,000 $cm^2/g$, since a great pulverizing power is required for obtaining such a Blaine specific surface area. Furthermore, when the Blaine specific surface area is large as such, the present admixture tends to be easily weathered, and the quality thereof also tends to considerably deteriorate with time.

Although there is no particular limit on the amount of the present admixture to be used, it is preferably from 5 to 50 parts, more preferably from 10 to 40 parts in 100 parts of the total of cement and the present admixture. When the amount is less than 5 parts, there may be a case where the effect of the present invention of reducing the heat of hydration cannot be sufficiently obtained, while when the amount exceeds 50 parts, there may be a case where the strength revelation becomes impaired.

In the present invention, there is no particular limit on the amount of water to be used. Water can be used in an amount range in general use. Specifically, the amount of water is preferably from 25 to 60 parts per 100 parts of the total of cement and the present admixture. When the amount is less than 25 parts, there may be a case where sufficient workability cannot be attained, while when the amount exceeds 60 parts, there may be a case where the strength revelation and the carbonation suppressing effect become insufficient.

When using the present admixture, the 32.5 $N/mm^2$ standards can be complied with by mixing from about 20 to 35 parts of the present admixture in 100 parts of the present cement composition, and the 42.5 $N/mm^2$ standards can be complied with by mixing from about 10 to 20 parts of the present admixture in 100 parts of the present cement composition.

Although there is no particular limitation on the cement to be used in the present invention, it is preferable to use a cement which contains Portland cement. Various kinds of Portland cements, such as normal strength, high early strength, super high early strength, low heat, and moderate heat, can be given. Furthermore, there can be given various kinds of mixed cements, with these Portland cements mixed with blast furnace slag, fly ash, or silica, waste-utilized cements, produced by use of ashes of incinerated urban garbage or sewerage sludge, so-called Ecocement (R), and a filler cement with limestone powder or like mixed therewith, and one or two or more of these can be used.

The present invention is useful to portland blast-furnace slag cement or Ecocement for which suppression of carbonation is strongly requested. In particular, it is most preferable to use in combination with portland blast-furnace slag cement.

There is no particular limitation on the particle size of the cement composition of the present invention, since it depends upon the purpose for its use and the application thereof. However, in terms of the value of the Blaine specific surface area, from 2,500 $cm^2/g$ to 8,000 $cm^2/g$ is preferable, and from 3,000 $cm^2/g$ to 6,000 $cm^2/g$ is more preferable. When it is less than 2,500 $cm^2/g$, there may be a case where strength revelation cannot be sufficiently obtained, while when it exceeds 8,000 $cm^2/g$, there may be a case where workability becomes impaired.

In the present invention, in addition to aggregates such as cement, the present admixture, sand and gravel, there can be employed one or two or more of admixture materials such as granulated blast furnace slag fine powder, slowly cooled blast furnace slag fine powder, limestone fine powder, fly ash, and silica fume, additives such as expansive additive, rapid-hardening material, water-reducing agent, AE water-reducing agent, super water-reducing agent, super AE water-reducing agent, anti-foaming agent, thickening agent, milderproofing agent, antifreezing agent, shrinkage-reducing agent, polymers, setting adjusting agent, clay minerals such as bentonite, and anionic exchanger such as hydrotalcite, conventionally known additives for use in ordinary cement materials, admixtures, and aggregates, in such a range that the objects of the present invention are not substantially hindered.

The cement composition of the present invention may be used by mixing each material at the time of work, or part of or all of the materials may have been mixed in advance.

Furthermore, in the present invention, there is no particular limitation on the method of mixing each material and water. Each material may be mixed at the time of work, or part of or all of the materials may have been mixed in advance. Alternatively, part of the materials is mixed with water, and then the remaining materials may be mixed therewith.

As a mixing apparatus, any conventional apparatus can be used. For example, slant cylinder mixer, Omni Mixer, Henschel mixer, V-type mixer, and Nauta mixer can be employed.

EXAMPLES

The present invention will now be further explained based on experiment examples of the present invention.

Experiment Example 1

In 100 parts of a cement composition composed of a cement and an admixture, by use of the admixture in an amount as shown in Table 1, mortars with a water/cement composition ratio of 50/100 and a cement composition/sand ratio of 1/3 were prepared, so that the measurement of the compressive strength and accelerated carbonation tests were carried out. For comparison, the same measurement and tests were carried out by use of limestone fine powder instead of the present admixture. The results of both are shown in Table 1.

<Materials Employed>
Cement: Conventional Portland cement (made by Denki Kagaku Kogyo K.K., specific gravity 3.15)
Admixture A: $\gamma$-2CaO.SiO$_2$. Synthesized by mixing a first grade reagent calcium carbonate and silicon dioxide in a molar ratio of 2:1, subjecting the mixture to heat treatment at 1,400° C. for 2 hours, and then air-cooling the same in the furnace. Blaine specific surface area, 4,000 cm$^2$/g. The content of fluorine was below the detection limit. A 12CaO.7Al$_2$O$_3$ solid solution was not contained.
Admixture B: $\alpha$-2CaO.SiO$_2$. Synthesized by mixing a first grade reagent calcium carbonate and silicon dioxide in a molar ratio of 1:1, subjecting the mixture to heat treatment at 1,500° C. for 2 hours, taking it out from the furnace, and then rapidly cooling the same. The content of fluorine was below the detection limit. A 12CaO.7Al$_2$O$_3$ solid solution was not contained. Blaine specific surface area, 4,000 cm$^2$/g.
Admixture C: Merwinite 3CaO.MgO.2SiO$_2$ (C$_3$MS$_2$). Synthesized by mixing a first grade reagent calcium carbonate, magnesium oxide and silicon dioxide in a molar ratio of 3:1:2, subjecting the mixture to heat treatment at 1,400° C. for 2 hours, taking it out from the furnace, and then rapidly cooling the same. Blaine specific surface area was 4,000 cm$^2$/g. The content of fluorine was below the detection limit. A 12CaO.7Al$_2$O$_3$ solid solution was not contained.
Admixture D: Akermanite 2CaO.MgO.2SiO$_2$. Synthesized by mixing a first grade reagent calcium carbonate, magnesium oxide and silicon oxide in a molar ratio of 2:1:2, subjecting the mixture to heat treatment at 1,400° C. for 2 hours, taking it out from the furnace, and then rapidly cooling the same. Blaine specific surface area, 4,000 cm$^2$/g. The content of fluorine was below the detection limit. A 12CaO.7Al$_2$O$_3$ solid solution was not contained.
Admixture E: Limestone fine powder. Main component, calcium carbonate. Blaine specific surface area, 4,000 cm$^2$/g.
Water: Tap water
Sand: JIS standard sand <Measurement Method>
Compressive strength: A 4×4×16 cm molded product was prepared and measured in accordance with JIS R 5201.
Adiabatic Temperature elevation: Measured by use of an air-circulation type adiabatic temperature elevation testing apparatus.
Depth of carbonation: A 4×4×16 cm molded product was prepared, and was subjected to water curing at 20° C. until it reached 28 days material age, and was then subjected to accelerated carbonation at 30° C., relative humidity 60%, in an atmosphere containing carbon dioxide at a concentration of 5%, for a predetermined period of time. The depth of carbonation was confirmed by coating a cross section of the mortar with a phenolphthalein 1% alcohol solution.

Experiment Example 2

Experiments were carried out in the same manner as in Example 1 except that the Blaine specific surface area of each admixture was changed as shown in Table 2, and that in 100 parts of the cement compositions, 25 parts were used. Furthermore, slag was used as admixture. For comparison, the same experiments were also carried out with respect to the cases where limestone fine powder, natural wollastonite, and $\beta$-2CaO.SiO$_2$ were used. The results are also shown together in Table 2.

<Materials Employed>
Admixture F: Natural wollastonite ($\beta$-2CaO.SiO$_2$), Blaine specific surface area, 4,000 cm$^2$/g.
Admixture G: $\beta$-2CaO.SiO$_2$. Synthesized by mixing a first grade reagent calcium carbonate and silicon dioxide in a molar ratio of 2:1, adding to 100 parts of this mixture 0.5 parts of MgO, 0.5 parts of Al$_2$O$_3$ and 0.5 parts of boric acid, subjecting the mixture to heat treatment at 1,500° C. for 2 hours in an electric furnace, then taking the mixture out from the electric furnace, and rapidly cooling the same. Blaine specific surface area, 4,000 cm$^2$/g.

Experiment Example 3

Experiments were carried out in the same manner as in Example 1 except that each kind of steelmaking slag was used as admixture. The results are altogether shown in Table 3.

<Materials Employed>
Cement: Commercially available conventional Portland cement
Slag powder ①: Electric furnace reducing period slag, CaO content 52%, SiO$_2$ content 27%, Al$_2$O$_3$ content 11%, MgO content 0.5%, F content 0.7%. Main chemical compound phases are $\gamma$-2CaO.SiO$_2$ content 45%, $\alpha$-CaO.SiO$_2$ content 20%, and 12CaO.7Al$_2$O$_3$ solid solution content 25%. The content of non-hydraulic compounds is 65% with the total of $\gamma$-2CaO.SiO$_2$ content 45%, and $\alpha$-CaO.SiO$_2$ content 20%.
Slag powder ②: Stainless slag, CaO content 52%, SiO$_2$ content 28%, MgO content Merwinite 3CaO.MgO.2SiO$_2$ about 44%, 12CaO.7Al$_2$O$_3$ solid solution content about 14%, free magnesia content about 4%. The content of non-hydraulic compounds is about 79% with the total of $\gamma$-2CaO.SiO$_2$ content 35% and Merwinite 3CaO.MgO.2SiO$_2$ about 44%. Blaine specific surface area 4,000 cm$^2$/g.
Slag powder ③: Electric furnace reducing period slag, CaO content 53%, SiO$_2$ content 35%, Al$_2$O$_3$ content 4%, MgO content 6%, F content 1.5%. Main chemical compound phases are γ-2CaO.SiO$_2$ content about 40%, Cuspidine content about 14%, Merwinite 3CaO.MgO.2SiO$_2$ content about 40%. The content of non-hydraulic compounds is about 95% with the total of γ-2CaO.SiO$_2$ content 40%, Cuspidine content about 14% and Merwinite 3CaO.MgO.2SiO$_2$ content about 40%. Blaine specific surface area 4,000 cm$^2$/g.

Slag powder ④: Electric furnace reducing period slag, CaO content 53%, SiO$_2$ content 26%, Al$_2$O$_3$ content 13%, MgO content 5%, F content 2.0%. Main chemical compound phases are γ-2CaO.SiO$_2$ content 40%, 12CaO.7Al$_2$O$_3$ solid solution content 25%, Cuspidine content about 12%, Merwinite 3CaO.MgO.2SiO$_2$ content about 18%. The content of non-hydraulic compounds is about 70% with the total of γ-2CaO.SiO$_2$ content 40%, Cuspidine content about 12% and Merwinite 3CaO.MgO.2SiO$_2$ content about 18%. Blaine specific surface area 4,000 cm$^2$/g.

Experiment Example 4

Experiments were carried out in the same manner as in Example 3 except that the Blaine specific surface area of each of slag ① and slag ② was changed as shown in Table 4 and that in 100 parts of the cement composition, 20 parts of the slag were used. The results are also shown in Table 4.

Experiment Example 5

Experiments were carried out in the same manner as in Experiment Example 1 except that in 100 parts of the cement composition, 25 parts of each kind of admixture with a Blaine specific surface area of 4,000 cm$^2$/g were used and a portland blast-furnace slag cement were used. Table results are also shown in Table 5.

<Materials Employed>

Portland blast-furnace slag type B cement: Commercially available portland blast-furnace slag cement type B Portland blast-furnace slag type C cement: Commercially available portland blast-furnace slag cement type C

INDUSTRIAL APPLICABILITY

By use of the cement admixture of the present invention, there can be obtained a cement composition with a small heat of hydration and a large carbonation suppressing effect. In particular, a remarkable carbonation suppressing effect can be obtained when used in portland blast-furnace slag cement.

Furthermore, the present invention can attain an effect that leads to an effective use of steelmaking slag and the like for which no effective use has not yet been found. Furthermore, in the present invention, the load of clinker can be reduced so that a cement composition of a low environmental load type can be attained. Further, this is also suitable for cements in conformity with the EN standards, which are used in civil engineering and building industries.

TABLE 1

| Experiment No. | Cement | Admixture | Compressive Strength (N/mm$^2$) | Adiabatic Temperature Elevation (°C.) | Depth of Carbonation (mm) 4 weeks | Depth of Carbonation (mm) 12 weeks | Notes |
|---|---|---|---|---|---|---|---|
| 1-1 | 100 | 0 | 54.1 | 53.5 | 0.5 | 2.0 | Comp. Ex. |
| 1-2 | 95 | A 5 | 53.9 | 52.3 | 0.5 | 1.5 | Example |
| 1-3 | 90 | A 10 | 48.5 | 48.0 | 1.5 | 2.0 | Example |
| 1-4 | 80 | A 20 | 40.7 | 43.1 | 2.5 | 3.5 | Example |
| 1-5 | 70 | A 30 | 33.0 | 37.7 | 4.0 | 4.5 | Example |
| 1-6 | 60 | A 40 | 24.2 | 32.0 | 7.0 | 8.5 | Example |
| 1-7 | 50 | A 50 | 19.5 | 27.1 | 8.0 | 12.0 | Example |
| 1-8 | 95 | B 5 | 53.1 | 52.0 | 0.5 | 2.0 | Example |
| 1-9 | 90 | B 10 | 48.1 | 47.5 | 1.5 | 3.0 | Example |
| 1-10 | 80 | B 20 | 40.2 | 42.8 | 2.0 | 6.0 | Example |
| 1-11 | 70 | B 30 | 32.2 | 37.2 | 3.5 | 8.0 | Example |
| 1-12 | 60 | B 40 | 23.5 | 31.8 | 5.5 | 12.5 | Example |
| 1-13 | 50 | B 50 | 18.4 | 26.6 | 9.5 | 16.5 | Example |
| 1-14 | 95 | C 5 | 52.1 | 51.0 | 0.5 | 2.5 | Example |
| 1-15 | 90 | C 10 | 45.3 | 46.7 | 1.5 | 3.5 | Example |
| 1-16 | 80 | C 20 | 38.5 | 41.9 | 3.0 | 6.5 | Example |
| 1-17 | 70 | C 30 | 31.0 | 36.5 | 4.5 | 8.5 | Example |
| 1-18 | 60 | C 40 | 22.7 | 31.4 | 6.5 | 13.5 | Example |
| 1-19 | 50 | C 50 | 17.9 | 26.3 | 9.0 | * | Example |
| 1-20 | 95 | D 5 | 53.2 | 51.8 | 0.5 | 3.5 | Example |
| 1-21 | 90 | D 10 | 48.0 | 47.0 | 1.5 | 5.5 | Example |
| 1-22 | 80 | D 20 | 41.0 | 42.1 | 3.0 | 8.5 | Example |
| 1-23 | 70 | D 30 | 32.5 | 37.7 | 4.5 | 12.5 | Example |
| 1-24 | 60 | D 40 | 23.9 | 32.6 | 7.5 | 17.5 | Example |
| 1-25 | 50 | D 50 | 18.9 | 27.0 | 10.0 | * | Example |
| 1-26 | 80 | A 10 + B 10 | 40.5 | 42.8 | 2.0 | 4.0 | Example |
| 1-27 | 80 | A 10 + C 10 | 39.7 | 42.4 | 2.0 | 4.0 | Example |
| 1-28 | 80 | A 10 + D 10 | 40.5 | 42.5 | 2.5 | 5.0 | Example |
| 1-29 | 80 | B 10 + C 10 | 39.4 | 42.2 | 2.5 | 6.0 | Example |
| 1-30 | 80 | B 10 + D 10 | 40.1 | 42.3 | 3.0 | 6.5 | Example |
| 1-31 | 80 | C 10 + D 10 | 39.0 | 41.8 | 3.0 | 7.0 | Example |
| 1-32 | 70 | A 10 + B 10 + C 10 | 32.5 | 36.9 | 3.5 | 6.0 | Example |
| 1-33 | 95 | E 5 | 53.6 | 51.5 | 1.5 | 3.5 | Comp. Ex. |
| 1-34 | 90 | E 10 | 47.5 | 48.5 | 3.0 | 9.5 | Comp. Ex. |
| 1-35 | 80 | E 20 | 40.6 | 43.5 | 5.0 | 17.5 | Comp. Ex. |

TABLE 1-continued

| Experiment No. | Cement | Admixture | Compressive Strength (N/mm$^2$) | Adiabatic Temperature Elevation (° C.) | Depth of Carbonation (mm) 4 weeks | 12 weeks | Notes |
| --- | --- | --- | --- | --- | --- | --- | --- |
| 1-36 | 70 | E 30 | 33.0 | 38.5 | 8.5 | * | Comp. Ex. |
| 1-37 | 60 | E 40 | 24.2 | 33.5 | 15.5 | * | Comp. Ex. |
| 1-38 | 50 | E 50 | 19.5 | 28.3 | * | * | Comp. Ex. |
| 1-39 | 100 | 0 | 33.5 | 51.9 | 8.0 | * | Comp. Ex. |

*The results of Experiment No. 1-39 are such that the water cement ratio was adjusted so as to have a compressive strength equivalent to the compressive strength of Experiments No. 1-5, 1-11, 1-17, 1-23, and others. The depth of carbonation * means the upper limit for measurement, 20 mm.

TABLE 2

| Experiment No. | Admixture Type | Blaine Specific Surface Area Value (cm$^2$/g) | Compressive Strength (N/mm$^2$) | Adiabatic Temperature Elevation (° C.) | Depth of Carbonation (mm) 4 Weeks | 12 Weeks | Notes |
| --- | --- | --- | --- | --- | --- | --- | --- |
| 2-1  | A | 2,000 | 38.0 | 40.2 | 5.0 | 7.5  | Example |
| 2-2  | A | 3,000 | 38.3 | 40.3 | 4.5 | 5.5  | Example |
| 2-3  | A | 4,000 | 38.8 | 40.5 | 3.0 | 4.0  | Example |
| 2-4  | A | 6,000 | 40.0 | 40.7 | 2.0 | 3.5  | Example |
| 2-5  | A | 8,000 | 40.7 | 41.1 | 1.5 | 3.0  | Example |
| 2-6  | B | 2,000 | 38.5 | 39.8 | 5.0 | 9.5  | Example |
| 2-7  | B | 3,000 | 38.5 | 39.9 | 4.0 | 8.0  | Example |
| 2-8  | B | 4,000 | 39.1 | 40.1 | 3.0 | 7.0  | Example |
| 2-9  | B | 6,000 | 39.4 | 40.2 | 2.0 | 6.0  | Example |
| 2-10 | B | 8,000 | 39.7 | 40.5 | 2.0 | 6.0  | Example |
| 2-11 | C | 2,000 | 40.7 | 40.2 | 5.0 | 10.5 | Example |
| 2-12 | C | 3,000 | 41.1 | 39.6 | 4.5 | 8.5  | Example |
| 2-13 | C | 4,000 | 41.5 | 39.2 | 2.5 | 7.5  | Example |
| 2-14 | C | 6,000 | 41.7 | 38.5 | 2.0 | 6.5  | Example |
| 2-15 | C | 8,000 | 41.9 | 38.2 | 2.0 | 6.5  | Example |
| 2-16 | E | 4,000 | 39.1 | 41.0 | 6.5 | 19.0 | Comp. Ex. |
| 2-17 | F | 4,000 | 38.5 | 43.2 | 6.5 | 18.0 | Comp. Ex. |
| 2-18 | G | 4,000 | 47.5 | 49.3 | 5.5 | 12.5 | Comp. Ex. |

TABLE 3

| Experiment No. | Cement | Slag Powder | Compressive Strength (N/mm$^2$) | Adiabatic Temp. Elevation (° C.) | Depth of Carbonation (mm) 4 Weeks | Notes |
| --- | --- | --- | --- | --- | --- | --- |
| 1-1  | 100 | 0     | 54.1 | 53.5 | 0.5  | Comp. Ex. |
| 3-1  | 95  | ①5    | 53.4 | 52.5 | 0.5  | Example |
| 3-2  | 90  | ①10   | 46.9 | 50.0 | 2.0  | Example |
| 3-3  | 80  | ①20   | 39.5 | 45.5 | 3.5  | Example |
| 3-4  | 70  | ①30   | 32.0 | 40.0 | 5.0  | Example |
| 3-5  | 60  | ①40   | 23.7 | 35.5 | 10.5 | Example |
| 3-6  | 50  | ①50   | 19.0 | 28.9 | 16.0 | Example |
| 3-7  | 95  | ②5    | 53.1 | 52.0 | 0.5  | Example |
| 3-8  | 90  | ②10   | 46.5 | 49.0 | 2.0  | Example |
| 3-9  | 80  | ②20   | 39.1 | 44.5 | 3.0  | Example |
| 3-10 | 70  | ②30   | 31.7 | 39.0 | 4.5  | Example |
| 3-11 | 60  | ②40   | 23.3 | 34.5 | 9.5  | Example |
| 3-12 | 50  | ②50   | 19.5 | 27.7 | 13.5 | Example |
| 3-13 | 95  | ③5    | 53.5 | 51.0 | 0.5  | Example |
| 3-14 | 90  | ③10   | 47.2 | 48.0 | 2.0  | Example |
| 3-15 | 80  | ③20   | 40.5 | 43.0 | 3.0  | Example |
| 3-16 | 70  | ③30   | 33.0 | 38.0 | 4.5  | Example |
| 3-17 | 60  | ③40   | 25.0 | 33.0 | 10.0 | Example |
| 3-18 | 50  | ③50   | 17.6 | 26.8 | 14.5 | Example |
| 3-19 | 95  | ④5    | 51.1 | 50.1 | 1.0  | Example |
| 3-20 | 90  | ④10   | 46.5 | 47.0 | 2.5  | Example |
| 3-21 | 80  | ④20   | 39.8 | 42.2 | 4.0  | Example |
| 3-22 | 70  | ④30   | 32.5 | 37.3 | 7.0  | Example |
| 3-23 | 60  | ④40   | 24.3 | 32.1 | 12.5 | Example |

TABLE 3-continued

| Experiment No. | Cement | Slag Powder | Compressive Strength (N/mm$^2$) | Adiabatic Temp. Elevation (°C.) | Depth of Carbonation (mm) 4 Weeks | Notes |
|---|---|---|---|---|---|---|
| 3-24 | 50 | ④ 50 | 19.1 | 28.7 | 19.5 | Example |
| 3-25 | 80 | ① 10 + ② 10 | 39.3 | 45.0 | 3.2 | Example |

TABLE 4

| Experiment No. | Admixture (Slag Powder) | Blaine Specific Surface Area Value (cm$^2$/g) | Compressive Strength (N/mm$^2$) | Adiabatic Temperature Elevation (°C.) | Depth of Carbonation (mm) 4 Weeks |
|---|---|---|---|---|---|
| 4-1 | ① | 2,000 | 39.0 | 45.0 | 5.0 |
| 4-2 | ① | 3,000 | 39.0 | 45.0 | 5.0 |
| 3-4 | ① | 4,000 | 39.5 | 45.5 | 3.5 |
| 4-3 | ① | 6,000 | 39.9 | 46.0 | 3.0 |
| 4-4 | ① | 8,000 | 40.3 | 46.5 | 2.5 |
| 4-5 | ② | 2,000 | 38.5 | 44.0 | 4.5 |
| 4-6 | ② | 3,000 | 38.5 | 44.0 | 4.5 |
| 3-9 | ② | 4,000 | 39.1 | 44.5 | 3.0 |
| 4-7 | ② | 6,000 | 39.4 | 45.0 | 2.5 |
| 4-8 | ② | 8,000 | 39.7 | 45.5 | 2.0 |

TABLE 5

| Experiment No. | Admixture | Cement | Compressive Strength (N/mm$^2$) | Adiabatic Temperature Elevation (°C.) | Depth of Carbonation (mm) 4 Weeks | 12 Weeks | Notes |
|---|---|---|---|---|---|---|---|
| 5-1 | None | Blast-Furnace Type B | 56.1 | 53.5 | 2.0 | 6.5 | Comp. Ex. |
| 5-2 | Admixture A | Blast-Furnace Type B | 42.2 | 40.5 | 1.5 | 3.0 | Examples |
| 5-3 | Admixture B | Blast-Furnace Type B | 41.7 | 40.7 | 5.0 | 9.0 | Examples |
| 5-4 | Admixture C | Blast-Furnace Type B | 39.5 | 39.0 | 4.5 | 8.5 | Examples |
| 5-5 | Admixture D | Blast-Furnace Type B | 41.9 | 39.8 | 5.5 | 10.5 | Examples |
| 5-6 | Admixture E | Blast-Furnace Type B | 42.4 | 41.0 | 9.0 | * | Comp. Ex. |
| 5-7 | Slag ① | Blast-Furnace Type B | 40.2 | 41.4 | 4.5 | 7.0 | Examples |
| 5-8 | Slag ② | Blast-Furnace Type B | 40.6 | 39.4 | 4.5 | 6.5 | Examples |
| 5-9 | Slag ③ | Blast-Furnace Type B | 37.1 | 37.7 | 6.5 | 9.5 | Examples |
| 5-10 | Slag ④ | Blast-Furnace Type B | 38.4 | 38.8 | 5.5 | 8.0 | Examples |
| 5-11 | None | Blast-Furnace Type C | 51.6 | 44.5 | 10.5 | * | Comp. Ex. |
| 5-12 | Admixture A | Blast-Furnace Type C | 38.5 | 33.1 | 2.5 | 6.5 | Examples |
| 5-13 | Admixture B | Blast-Furnace Type C | 36.7 | 33.3 | 8.5 | 14.5 | Examples |
| 5-14 | Admixture C | Blast-Furnace Type C | 35.1 | 32.2 | 8.0 | 14.0 | Examples |
| 5-15 | Admixture D | Blast-Furnace Type C | 37.7 | 32.7 | 10.5 | 18.5 | Examples |
| 5-16 | Admixture E | Blast-Furnace Type C | 39.0 | 33.5 | 16.5 | * | Comp. Ex. |
| 5-17 | Slag ① | Blast-Furnace Type C | 38.0 | 34.5 | 8.5 | 13.5 | Examples |
| 5-18 | Slag ② | Blast-Furnace Type C | 36.9 | 33.0 | 8.0 | 12.5 | Examples |
| 5-19 | Slag ③ | Blast-Furnace Type C | 33.2 | 31.1 | 12.5 | 18.5 | Examples |
| 5-20 | Slag ④ | Blast-Furnace Type C | 35.8 | 32.4 | 10.0 | 15.5 | Examples |

Note:
Kinds of cements
Blast-furnace Type B: Commercially available portland blast-furnace slag cement
Blast-furnace Type C: Commercially available portland blast-furnace slag cement

The invention claimed is:

1. A cement composition comprising a cement settable by hydration and subject to carbonation and a cement admixture which is a non-hydraulic material comprising the compound γ-2CaO·SiO$_2$ as a main component, the total content of γ-2CaO·SiO$_2$ in the non-hydraulic admixture material being 65% or more, the content of 12CaO·7Al$_2$O$_3$ and/or 11CaO·7Al$_2$O$_3$·CaF$_2$ being 25% or less, the total content of fluorine being 2% or less, and the content of the cement admixture being 5-50 parts in 100 parts of the total of the cement and the cement admixture.

2. The cement composition according to claim 1, wherein the cement admixture is electric furnace reducing period slag.

3. The cement composition according to claim 1, wherein the cement admixture is stainless slag.

4. The cement composition according to claim 1, wherein the cement is Portland cement.

5. The cement composition according to claim 2, wherein the cement is Portland cement.

6. The cement composition according to claim 3, wherein the cement is Portland cement.

7. The cement composition according to claim 1, wherein the cement is Portland blast-furnace slag cement.

8. The cement composition according to claim 2, wherein the cement is Portland blast-furnace slag cement.

9. The cement composition according to claim 3, wherein the cement is Portland blast-furnace slag cement.

10. The cement composition according to claim 1, wherein the Blaine specific surface area of the cement composition is 2500 cm$^2$/g or more.

11. The cement composition according to claim 1, wherein the Blaine specific surface area of the cement admixture is 2000 cm$^2$/g or more.

12. The cement composition according to claim 1, wherein the cement admixture is electric furnace reducing period slag, having a total fluorine content of 2% or less and a Blaine specific surface area of 2500 cm$^2$/g to 8000 cm$^2$/g.

13. The cement composition according to claim 1, wherein the cement admixture is stainless slag having a total fluorine content of 2% or less and a Blaine specific surface area of 2500 cm$^2$g to 8000 cm$^2$/g.

* * * * *